United States Patent
Albers et al.

(10) Patent No.: US 6,998,100 B2
(45) Date of Patent: Feb. 14, 2006

(54) SULFUR OXIDE SORPTION WITH LAYERED CHLORITE-TYPE CONTACT SOLIDS

(75) Inventors: Edwin W. Albers, Severna Park, MD (US); Harry W. Burkhead, Jr., Halethorpe, MD (US)

(73) Assignee: Toll Processing and Consulting, LLC, Baltimore, MD (US)

( * ) Notice: Subject to any disclaimer, the term of this patent is extended or adjusted under 35 U.S.C. 154(b) by 19 days.

(21) Appl. No.: 10/715,492

(22) Filed: Nov. 19, 2003

(65) Prior Publication Data

US 2005/0106089 A1 May 19, 2005

(51) Int. Cl.
 *B01D 53/50* (2006.01)
 *B01J 20/12* (2006.01)
 *B01J 20/16* (2006.01)

(52) U.S. Cl. ............................ 423/244.01; 423/244.04; 423/244.09; 423/244.1; 502/410; 502/415

(58) Field of Classification Search ............ 423/244.01, 423/244.04, 244.09, 244.1; 502/400, 406, 502/407, 410, 411, 415, 517
See application file for complete search history.

(56) References Cited

U.S. PATENT DOCUMENTS

| | | | | |
|---|---|---|---|---|
| 3,917,541 A | * | 11/1975 | Wright et al. | 502/225 |
| 3,963,602 A | * | 6/1976 | Wright et al. | 208/111.25 |
| 4,866,019 A | | 9/1989 | van Broekhoven | 502/65 |
| 4,952,382 A | | 8/1990 | van Broekhoven | 423/244 |
| 5,079,203 A | * | 1/1992 | Pinnavaia et al. | 502/84 |
| 5,114,691 A | * | 5/1992 | Pinnavaia et al. | 423/244.02 |
| 5,114,898 A | * | 5/1992 | Pinnavaia et al. | 502/406 |
| 5,116,587 A | * | 5/1992 | Pinnavaia et al. | 423/244.02 |
| 5,326,734 A | * | 7/1994 | Vaughan | 502/84 |
| 5,330,943 A | * | 7/1994 | Shi et al. | 502/62 |
| 5,358,701 A | * | 10/1994 | Pinnavaia et al. | 423/242.1 |
| 5,364,828 A | * | 11/1994 | Cox et al. | 502/341 |
| 5,399,329 A | * | 3/1995 | Schutz et al. | 423/415.1 |
| 5,416,051 A | * | 5/1995 | Vaughan | 502/84 |
| 5,507,980 A | * | 4/1996 | Kelkar et al. | 264/15 |
| 5,595,716 A | * | 1/1997 | Torii et al. | 423/328.2 |
| 5,785,938 A | * | 7/1998 | Pinnavaia et al. | 423/244.01 |
| 5,801,115 A | | 9/1998 | Albers et al. | 502/342 |
| 5,928,496 A | | 7/1999 | Albers et al. | 208/113 |
| 6,156,696 A | * | 12/2000 | Albers et al. | 502/339 |
| 6,497,811 B1 | * | 12/2002 | Myrstad et al. | 208/113 |

FOREIGN PATENT DOCUMENTS

| JP | 49-94591 | * | 9/1974 |
|---|---|---|---|
| WO | WO 99/19251 | * | 4/1999 |

OTHER PUBLICATIONS

English translation of JP 49–94591, published Sep. 1974.*

* cited by examiner

*Primary Examiner*—Stanley S. Silverman
*Assistant Examiner*—Ardith E. Hertzog
(74) *Attorney, Agent, or Firm*—Levy & Grandinetti

(57) ABSTRACT

Chlorite-like phyllosilicate materials are found useful as $SO_x$ sorbents. A novel process of sulfur oxide sorption is provided utilizing these layered materials as contact solids. Typical industrial applications include sulfur removal from fluid catalyst cracking process, cold-side combustion gas sulfur abatement and cleaner coal gasification.

17 Claims, No Drawings

SULFUR OXIDE SORPTION WITH LAYERED CHLORITE-TYPE CONTACT SOLIDS

FIELD OF THE INVENTION

The present invention relates to chlorite-containing sorbents useful in sulfur abatement.

BACKGROUND OF THE INVENTION

The present invention provides suitable magnesia-rich sorbents for fluidizable catalysts or contact solids, methods for using such materials to reduce the emissions of sulfur compounds from industrial processes, and methods for preparing such contact solids or catalysts. The conversion, processing or burning of sulfur-containing fossil fuels can result in the emission of sulfur-containing compounds, such as $H_2S$ and $SO_x$, to the atmosphere. To comply with increasingly stringent environmental regulations, materials are sought to reduce the emissions of sulfur compounds from industrial processes. Several methods of desulfurization are currently being used commercially. These methods include flue gas scrubbing as well as various fixed bed, ebullating bed, and fluid bed catalytic reaction processes. Some of these processes treat the flue gas just prior to the release of gas to the atmosphere.

Other processes are performed upstream of the emission release in order to prevent the undesired emission from occurring. The goal of such processes is to reduce emission of sulfur-containing compounds into the atmosphere.

Industry is lacking an economic and effective sorbent composition for economically removing sulfur oxides from emissions from a variety of industrial processes, such as fluidized bed cracking of heavy petroleum or additive contact solids for use in cold side combustion effluent treatment. Further, the industry lacks effective and economical methods for using a fluidized bed of particles to remove sulfur oxides from emissions.

A structural description of the class of "brucite" crystals is found in the work of Pinnavaia et al (U.S. Pat. No. 5,358,701, incorporated by reference). Briefly, the metal oxide layers of these crystals consist essentially of magnesium oxide (magnesia, MgO) configured structurally such that it contains octahedral hydroxy groups. A trivalent metal oxide, such as alumina ($Al_2O_3$), can be inserted into the brucite crystalline lattice in the octahedrally-coordinated metal oxide layer. Some of these brucitic materials are known as sorbents per se (see U.S. Pat. No. 5,928,496). Other brucitic materials are known as binders for sorbent contact solids.

SUMMARY OF THE INVENTION

It has been discovered that magnesia-rich layered phyllosilicates, especially chlorites have sorption properties that are useful for $SO_x$ abatement. Since such phyllosilicate materials are stable in the crystalline oxide structure and essentially reversible in sorbent properties up to about 400° C., stable sorbents may be employed in moderately elevated temperature industrial processes, such as cold side combustion effluent treatment of fossil fuel burning power plants. Natural chlorites containing up to 30 weight percent MgO are known and are useful in this invention, with those containing about 14 to 29 wt % MgO being preferred to be used herein.

In a preferred embodiment of the invention, a novel process of sulfur oxide sorption is provided, wherein a gas containing sulfur oxide is contacted at elevated process temperature of from about 200° C. up to about 750° C., with a solid phyllosilicate sorbent material to remove sulfur oxide from the gas. A preferred solid phyllosilicate sorbent material comprises crystalline materials having alternating silicate layers and layers having a brucite crystalline structure containing divalent and trivalent metal oxides comprising predominantly magnesia and alumina present in the brucite structure. The amount of phyllosilicate in the solid sorbent can vary from about 10 to 100 wt %. A preferred sorbent composition comprises a mixture of 10 to 90 parts by weight of magnesia-rich chlorite containing about 10–30 weight percent MgO and 10 to 90 parts by weight of hydtrotalcite containing at least 50 weight percent MgO. Sulfur oxide sorption and/or desorption may be enhanced by incorporating the catalyst composition, a solid sorbent material having an effective amount of a metal oxide disposed thereon. Representative metal oxides include cerium, vanadium and platinum in an effective amount.

The invention also provides processes for reducing the amount of $SO_x$ emissions issuing from a fluidized particle bed commercial process, such as fluid catalytic cracking of heavy petroleum fractions or in fossil fuel combustion, such as coal combustion processes.

DETAILED DESCRIPTION OF THE INVENTION

In the following description, units are given as parts by weight and metric units unless otherwise indicated.

The chlorite group of crystalline materials is often not considered a part of the genus of clays and is sometimes left alone as a separate group within the phyllosilicate structures. It is a relatively large and common group of materials although its members are not especially widely well known. Some of the recognized members of this group of materials include: Amesite, Baileychlore, Chamosite, Clinochlore, Cookeite, Corundophilite, Gonyerite, Nimite, Odinite, Orthochamosite, Penninite, Pannantite, Rhipidolite, (prochlore), Sudoite, and Thuringite. The term chlorite is often used to denote any member of this group when differentiation between the different members is not possible or needed. The general formula is $X_{4-6}Y_4O_{10}(OH, O)_g$. The X represents aluminum, iron, lithium, magnesium, manganese, nickel, zinc or chromium. The Y represents aluminum, silicon, boron or iron, but usually aluminum/or and silicon.

The gibbsite layers found in conventional clay groups are replaced in the chlorites by a similar layer that is analogous to the oxide brucite. The structure of this group is composed of silicate layers sandwiching a brucite, or a layer similar to brucite, layer in between, in an s-b-s stacking sequence similar to the above groups. However, in the chlorites, it is believed that there is an extra weakly bonded brucite layer in between the s-b-s sandwiches. This gives the structure an s-b-s b s-b-s b sequence. Variable amounts of water molecules can be disposed between the s-b-s sandwiches and the brucite layers.

Manufacturing Processes

The manufacturing materials and methods useful in practicing this invention are typically disclosed in U.S. Pat. No. 5,928,496 (Albers et al) and PCT Publication No. WO 99/19251, both of which are incorporated herein by reference.

The magnesia-rich contact solids made according to this invention may be self-bound or may include a binder component to hold the inorganic compounds together in the desired shape, such as spheroidal particles. Depending on the application, different binding systems can be used, and binders may be added to milled metal oxides/salts prior to forming them into an aquous slurry. For example, in more severe high temperature applications, such as fluid cracking catalyst (eg—700–820° C.), a hydrothermally stable inorganic binder such as aluminum chlorohydrol or peptized alumina may be used. Effective inorganic binders include sols of aluminum such as aluminum chlorohydrol, peptized aluminas, sols of silica, colloidal silicas, sols of titanium, sols of zirconium clays such as bentonite, calcined kaolinite, kaolinite, metakaolin, montmorillonite, low-magnesia chlorites, talc, and mixtures of these. Preferred inorganic binders include a sol of aluminum, peptized alumina, a sol of silica, colloidal silica, a sol of titanium, a sol of zirconium, a clay, and mixtures thereof.

Slurry Techniques

Finely-divided milled solids components are mixed with water, preferably containing about 0.1 to 1 wt % surfactant comprising acid stable fluorohydrocarbon, prior to forming and drying the contact solids product of this invention. It may be advantageous to provide pre-blended, dry-milled materials for dispersion in water which will then be spray dried or otherwise manufactured into dry particles in a short time period. Hydrolyzable metal oxides and salts are advantageously pre-blended and stored in the substantial absence of added water. Batch or continuous inline feeding of slurry components is well known. Thereafter, the slurry is pumped or otherwise transported to a spray dryer feed tank.

It is a significant advantage to use limited amounts of water in forming a fluent slurry for spray drying. By decreasing the amount of water below a weight ratio of 2:1 water:solids (i.e.—typically 30 wt % or more solids), energy savings are realized in the drying step. By maintaining effectively dry (low moisture) solids in admixture before forming the slurring within, for instance one hour before drying, surface hydrolysis is avoided or minimized.

In the preferred methods, a suitable alkaline stable or acid stable surfactant is added to the slurry. Surfactants for improving the physical and catalytic properties of FCC catalysts are disclosed in U.S. Pat. No. 5,330,943 (Shi et al). Improved attrition resistance and standard testing (i.e.— Attrition Index or "AI") are described by Shi et al., who recommend about 0.25–4 grams of surfactant per 5 kg of spray dried product. Preferred acid stable surfactants are fluorohydrocarbons manufactured under the trade name of duPont "Zonyl TBS" or of 3M "FC-95", and 0.01–1 wt % of surfactant is satisfactory. The use of surfactant is believed to contribute to attrition resistance by decreasing the advent of "blow holes" during spray drying of the catalyst composition.

Spray Drying

Conventional spray drying techniques are known to the industry, usually withdrawing water from a slurry containing sufficient water to form a fluent mixture of solids and liquid phases, advantageously incorporating a surfactant to impart homogeneity and desirable mechanical properties to the resulting dry products. Heat and low pressure in the spray drying unit permit flashing or rapid evaporation of the liquid phase from a slurry, resulting in agglomeration of smaller particles to form larger solids, typically having a spheroidal shape and a particles size distribution in the 20–250 micron ($\mu$) range or larger. In the manufacture of FCC catalyst or additive solids, the particles typically have an average size of 20–100$\mu$. In sorbent particles for fluid bed processes, a larger particle having an average size of about 150–200$\mu$ may be desired.

The phyllosilicate sorbent composition of this invention may include a combination of inorganic oxides with an inorganic binder, an organic binder, or a mixture of inorganic and organic binders. Desirable inorganic oxides include a member selected from the group consisting of oxides or hydroxides of aluminum, calcium, cobalt, copper, iron, magnesium, molybdenum, silicon, titanium, vanadium, zinc, tungsten, strontium, nickel, manganese, zirconium, barium, members of the lanthanide series and mixtures thereof. Synthetic hydrotalcites having a large MgO content (preferably about 50–70 wt %) are particularly suitable for use as $SO_x$ sorbents.

The contact solid composition may be self-bound or may include a binder component to hold the inorganic oxide particles together into the desired shape, such as spheroidal particles. Depending on the application, different binding systems are used. For example, in more severe high temperature applications, such as fluid cracking catalyst (e.g.— 700–820 C), a hydrothermally stable inorganic binder such as aluminum chlorohydrol or peptized alumina may be used.

Effective inorganic binders include sols of aluminum such as aluminum chlorohydrol, peptized aluminas, sols of silica, colloidal silicas, sols of titanium, sols of zirconium clays such as bentonite, calcined kaolinite, kaolinite, metakaolin, montmorillonite, chlorite, talc, and mixtures of these. Desirable inorganic binders include a sol of aluminum, peptized alumina, a sol of silica, colloidal silica, a sol of titanium, a sol of zirconium, clay, and mixtures thereof.

The smectite clays are especially desirable alone or in combination with zinc oxide/titania mixtures. In some applications, such as those that employ a fluidized or ebullating solid catalyst bed, such as those used in many flue gas desulfurization units, an organic binder such as hydroxypropyl methyl cellulose or polyvinyl alcohol is used.

Other components can be added to the catalyst composition to enhance the performance of conversion catalyst in specific applications or for a specific set of operating conditions. An oxidation promoter such as platinum or cerium can be added to the catalyst solids to facilitate the oxidation of $SO_2$ to $SO_3$, for instance in a fluid cracking catalyst regenerator, thus improving the overall performance of the catalyst. Desirable additional components can include any number of activators, promoters, oxidizers, reducers, scavengers, and mixtures of these components. These materials may enhance performance. The solid composition preferably is prepared in the form of a spheroidal particle of about 1 to 10,000 microns diameter.

Sorption Process Applications

The inventive process reduces the amount of $SO_x$ emissions emerging from a fluidized particle bed. This process may comprise the step of introducing into the fluid particle bed a microspheroidal catalyst having a composition comprising at least 10 wt % of $SO_x$-capturing MgO-rich chlorite-type phyllosilicate. Typically, this involves sorbing or capturing $SO_3$ in the fluid particle bed regenerator as an inorganic sulfate in a fluid cracking catalytic operation. In a petroleum refinery $SO_x$ emissions are often generated in the catalyst regenerator and released in its flue gas.

A typical sulfur abatement process includes the step of introducing into the fluid particle bed a microspheroidal catalyst having a composition comprising at least one $SO_x$- capturing oxide and at least one inorganic binder. Oxidation of $SO_2$ to $SO_3$ can be achieved employing an oxidation promoter catalytic component.

The capture of $SO_3$ in the regenerator of an FCC unit as an inorganic sulfate on the $SO_x$-capturing oxide is usually followed by reducing the inorganic sulfate to a sulfide in a stripper. Then, the sulfur can be released as $H_2S$ upon hydrogenolysis or reduction in the stripper. Incorporation of a minor amount of a vanadium oxide component in the contact solids promotes reduction of sulfate during regeneration of the sorbent.

The catalyst composition is desirably formed into a fluidizable particle having an average particle size in the range of about $20\mu$–$300\mu$, that is useful in both conventional fluidized bed and ebullating bed processes. The $SO_x$-capturing oxide of the invention is desirably a magnesia-rich solid and/or mixed inorganic oxide additive for catalyzing the capture and release of sulfur-containing compounds in the fluid cracking catalyst. In a preferred embodiment, the $SO_x$-capturing additive is a solid sorbent material contains hydrotalcite consisting predominately of magnesia. This provides refiners with an effective means for reducing $SO_x$ emissions, especially from an FCC unit regenerator. The invention provides a contact solids or catalyst composition employed as a formed spheroidal catalyst that reduces the emissions of sulfur containing compounds from industrial processes. For example, in the preferred embodiment of the invention, the MgO-rich phyllosilicate captures and thereby removes the sulfur containing species, such as $H_2S$ or $SO_x$ that is present in the gas stream being heated. Advantageously, this invention is employed to reduce emissions of sulfur compounds from a fluid cracking catalyst (FCC) process especially a catalyst regenerator used in conjunction with the fluid bed cracking operation. Particulate solids are added to the FCC unit in the same manner as the conventional cracking catalyst (e.g.—REY zeolite). The magnesia-rich brucitic additive can be introduced separately or together in a mixture with the cracking catalyst. Usually the addition is accomplished by a pneumatic conveying system to blow the material directly into the FCC catalyst regenerator. The catalyst additive then circulates through the fluid cracking catalyst unit in direct contact and along with the fluid cracking catalyst. The quantity of fluid cracking catalyst additive that is added and which then circulates in the unit is sufficient to effectively reduce the emissions of sulfur containing compounds from the FCC unit, yet it should not be present in a proportion so large that it deleteriously affects the operation of the cracking process reactions. Fluid cracking catalyst additive level of between about 0.5 and about 10 weight percent of the circulating fluid cracking catalyst inventory is desirable.

Industrial processes for sulfur oxide abatement may be conducted at various temperatures. In a coal gasification process, the flue gas or hot gas is passed through a fluidized or ebullating bed of catalyst to remove sulfur compounds. Whereas cold side flue gas abatement may be carried out advantageously at about 200° to 400° C., more elevated temperatures in the 400° to 700° C. range may be employed. FCC processes may employ the sorbents at 700° to 820° C. or higher temperature, as will be understood by the skilled chemical engineer.

Sulfur Oxide Sorption Testing

A standard test method for measuring such sorption characteristics is thermogravimetric analysis (TgA), wherein a test sample of the crystalline solid material is heated at predetermined rate to 700 C, releasing water of hydration. A gaseous stream containing the sulfur oxide is then contacted with the sample and weight of sorbed material is measured. Regeneration of the sorbent (i.e.—by reduction of sulfate to sulfite) can be effected by passing a hot gas, such as hydrogen over the sample.

In the following examples, various contact solids were tested by TgA for comparing $SO_x$ sorption in a controlled heating, sorption and regeneration cycle. A standard duPont TgA unit is employed to test samples in the TgA ramp method. The sample is heated at uniform rate to 700° C. with a flowing stream of nitrogen through the sample. The sorption cycle employs 3000 ppm $SO_2$ in a carrier gas stream containing 3 wt % oxygen and balance nitrogen and maintains the sample at predetermined temperature of 700° C. for at least 30 minutes during sulfur oxide sorption. Regeneration is performed by hot hydrogen gas flowing over the sample at 650° C.

Typical naturally-occurring minerals having a chlorite structure are given in the following tables.

TABLE 1

Amesite

| Chemical Formula: | $Mg_2Al(SiAl)O_5(OH)_4$ | | | | |
|---|---|---|---|---|---|
| Composition: | Molecular Weight = 278.68 gm | | | | |
| | Magnesium | 17.44% | Mg | 28.92% | MgO |
| | Aluminum | 19.36% | Al | 36.59% | $Al_2O_3$ |
| | Silicon | 10.08% | Si | 21.56% | $SiO_2$ |
| | Hydrogen | 1.45% | H | 12.93% | $H_2O$ |
| | Oxygen | 51.67% | O | | |
| | | 100.00% | | 100.00% | = TOTAL OXIDE |
| Empirical Formula: | $Mg_2Al_2SiO_5(OH)_4$ | | | | |

TABLE 2

Chamosite

Chamosite

| Chemical Formula: | $(Fe^{++}, Mg, Fe^{+++})_5 Al(Si_3Al)O_{10}(OH, O)_8$ | | |
|---|---|---|---|
| Composition: | Molecular Weight = 660.15 gm | | |
| | Magnesium | 5.52% | Mg |
| | Aluminum | 8.17% | Al |
| | Iron | 29.61% | Fe |
| | Silicon | 12.76% | Si |
| | Hydrogen | 0.31% | H |
| | Oxygen | 43.63% | O |
| | | 100.00% | |
| Empirical Formula: | $Fe^{2+}_3Mg_{1.5}AlFe^{3+}_{0.5}Si_3AlO_{16}(OH)_2$ | | |

TABLE 3

Orthochamosite

| Chemical Formula: | $(Fe^{++}, Mg, Fe^{+++})_5Al(Si_3Al)O_{10}(OH, O)_8$ | | | | |
|---|---|---|---|---|---|
| Composition: | Molecular Weight = 664.18 gm | | | | |
| | Magnesium | 5.49% | Mg | 9.10% | MgO |
| | Aluminum | 8.12% | Al | 15.35% | $Al_2O_3$ |
| | Iron | 29.43% | Fe | 32.45% | FeO/ |
| | | | | 6.01% | $Fe_2O_3$ |
| | Silicon | 12.69% | Si | 27.14% | $SiO_2$ |
| | Hydrogen | 0.91% | H | 8.14% | $H_2O$ |
| | Oxygen | 43.36% | O | | |
| | | 100.00% | | 98.19% | = TOTAL OXIDE |
| Empirical Formula: | $Fe^{2+}_3Mg_{1.5}Fe^{3+}_{0.5}Al_2Si_3O_{12}(OH)_6$ | | | | |

TABLE 3

Clinochlore (kaemmererite)

| Chemical Formula: | (Mg, Fe++)5Al(Si3Al)O10(OH)8 | | | |
|---|---|---|---|---|
| Composition: | Molecular Weight = 595.22 gm | | | |
| | Magnesium | 15.31% | Mg 25.39% | MgO |
| | Aluminum | 9.07% | Al 17.13% | $Al_2O_3$ |
| | Iron | 11.73% | Fe 15.09% | FeO |
| | Silicon | 14.16% | Si 30.28% | $SiO_2$ |
| | Hydrogen | 1.35% | H 12.11% | $H_2O$ |
| | Oxygen | 48.38% | O | |
| | | 100.00% | 100.00% | = TOTAL OXIDE |
| Empirical Formula: | $Mg_{3.75}Fe^{2+}{}_{1.25}Si_3Al_2O_{10}(OH)_8$ | | | |

TABLE 4

Goyerite

| Composition: | Molecular Weight = 703.49 gm | | | |
|---|---|---|---|---|
| | Magnesium | 10.36% | Mg 17.19% | MgO |
| | Manganese | 23.43% | Mn 30.25% | MnO |
| | Iron | 9.53% | Fe 13.62% | $Fe_2O_3$ |
| | Silicon | 15.17% | Si 32.46% | $SiO_2$ |
| | Hydrogen | 0.57% | H 5.12% | $H_2O$ |
| | Oxygen | 40.94% | O | |
| | | 100.00% | 98.64% | = TOTAL OXIDE |
| Empirical Formula: | $Mg_3Mn^{2+}{}_3Fe^{3+}Si_{3.8}Fe^{3+}{}_{0.2}O_{14}(OH)_4$ | | | |

TABLE 4

Nimite

| Chemical Formula: | (Ni, Mg, Fe++)5Al(Si3Al)O10(OH)8 | | | |
|---|---|---|---|---|
| Composition: | Molecular Weight = 666.98 gm | | | |
| | Magnesium | 6.19% | Mg 10.27% | MgO |
| | Aluminum | 8.09% | Al 15.29% | $Al_2O_3$ |
| | Iron | 5.86% | Fe 3.23% | FeO/4.79% $Fe_2O_{<>}$ |
| | Silicon | 12.63% | Si 27.03% | $SiO_2$ |
| | Nickel | 22.88% | Ni 29.12% | NiO |
| | Hydrogen | 1.16% | H 10.40% | $H_2O$ |
| | Oxygen | 43.18% | O | |
| | | 100.00% | 100.12% | = TOTAL OXIDE |
| Empirical Formula: | $Ni_{2.6}Mg_{1.7}AlFe^{3+}{}_{0.4}Fe^{2+}{}_{0.3}Si_3AlO_{10.3}(OH)_{7.7}$ | | | |

TABLE 5

Sudoite

| Chemical Formula: | Mg2(Al, Fe+++)3Si3AlO10(OH)8 | | | |
|---|---|---|---|---|
| Composition: | Molecular Weight = 546.77 gm | | | |
| | Magnesium | 8.45% | Mg 14.01% | MgO |
| | Aluminum | 19.25% | Al 36.36% | $Al_2O_3$ |
| | Iron | 3.06% | Fe 1.31% | FeO/2.92% $Fe_2O_{<>}$ |
| | Silicon | 15.41% | Si 32.97% | $SiO_2$ |
| | Hydrogen | 1.46% | H 13.01% | $H_2O$ |
| | Oxygen | 52.38% | O | |
| | | 100.00% | 100.59% | = TOTAL OXIDE |
| Empirical Formula: | $Mg_{1.9}Fe^{2+}{}_{0.1}Al_{2.9}Fe^{3+}{}_{0.2}Si_3AlO_{10}(OH)_{7.9}$ | | | |

In addition to the desired chlorite-type materials, magnesia-rich hydrotalcite containing about 50–70% MgO are excellent $SO_x$ sorbents, alone or in combination with other materials. An example of suitable synthetic HTC (Sasol "PURAL MG 70") is provided, as described in the following Table.

TABLE 6

Hydrotalcite - (HTC)

| HTC | | | | |
|---|---|---|---|---|
| Composition: | Magnesium | 70.8% | MgO | |
| | Aluminum | 29.2% | $Al_2O_3$ | |
| Surface Area | 201 m2/g | | | |
| Particle size | <25 micron | 59.2% | | |
| | <45 micron | 92.9% | | |
| | <90 micron | 100% | | |
| Size at 50% | 21.6 micron | | | |
| Bulk Density | 0.59 g/ml. | | | |

Sorption Examples:

EXAMPLE 1

A standard TgA $SO_2$ sorption test is run with an admixture of 60 parts by weight of Luzenac chlorite (30 wt % MgO) and 40 parts inert solids (Thiele RC-87 kaolin clay), to which is added 12 parts cerium oxide and 2 parts vanadium pentoxide. The test sample had an average particle size of about 2–10 microns. TgA preheat cycle of about 38 minutes reduced the standardized sample from 100 weight units to about 92 units, probably due to dehydration. $SO_x$ sorption at 70 minutes increased the weight of the sample to about 95.5 units, and hot hydrogen desorption further reduced the sample to 89 weight units. The same sample was subjected to a second sorption cycle, which provided increased sorption from the standardized 100 units to about 106 units. Although the mechanism for increased sorption capacity with recycle is not fully understood, it is clearly demonstrated that solid sorbent is regenerated with hot hydrogen and recyled, thereby enhancing sulfur oxide sorption properties.

EXAMPLE 2

The above example 1 is repeated with a mixture of 20 parts by weight of the magnesia-rich chlorite, 50 parts of "Pural MG 70" hydrotalcite, 30 parts kaolin, and the same amounts of cerium and vanadium additives. TgA preheat cycle of about 34 minutes reduced the standardized sample from 100 weight units to about 98 units. $SO_x$ sorption at 50 minutes increased the sample to about 114 units, and hot hydrogen desorption further reduced the sample to about 95 weight units. The mixture of two magnesia-rich components appears to have greater $SO_x$ sorption capacity than would be expected from each component acting alone.

EXAMPLE 3

The above example 1 is repeated with a mixture of 60 parts by weight hydrotalcite, 40 parts kaolin, and the same amounts of cerium and vanadium additives. TgA preheat cycle of about 30 minutes reduced the standardized sample weight from 100 weight units to about 95 units. $SO_x$ sorption at 60 minutes increased the sample weight to about 114 units, and hot hydrogen desorption further reduced the sample weight to about 93 weight units.

According to the present invention, it is advantageous to employ solid sorbent material comprising at least one layered magnesia-rich crystalline material containing layers of brucite structure, wherein the brucite material is predominately magnesia, having an average MgO content of at least about 50 wt %, particularly wherein the sorbent comprises a mixture of magnesia-rich chlorite and hydtrotalcite in a weight ratio of about 10:90 to 90:10 chlorite:hydtrotalcite.

While the invention has been shown and described by particular examples, there is no intent to limit the inventive concept except as in the following claims.

What is claimed is:

1. A process for sulfur oxide abatement comprising:
contacting a gas containing sulfur oxide at an elevated process temperature that is sufficient to enable sulfur oxides to be sorbed from said gas with a sufficient amount of solid sorbent material to remove sulfur oxide from the gas;
wherein said solid sorbent material comprises at least one layered phyllosilicate having alternating silicate and brucite layers and comprising about 10–30 weight percent magnesium oxide.

2. The process of claim 1 wherein the gas includes a vapor phase derived from a process comprising oxidative regeneration of deactivated cracking catalyst; comprising:
forming sulfur dioxide during said oxidative regeneration,
converting said sulfur dioxide to sulfur trioxide by contacting said gas at elevated temperature with solid sorbent material having sulfur oxide sorption ability and having an oxidation catalyst comprising at least one metal disposed thereon that is adapted to catalyze the conversion of said sulfur dioxide to sulfur trioxide.

3. The process of claim 2 wherein the solid sorbent material is regenerated by desorbing sulfur values therefrom and recycled, whereby the amount of sulfur oxide sorbed in said recycle operation is increased as compared to the amount of sulfur oxide sorbed in a first pass of said gas in contact with said solid sorbent material having said oxidation catalyst disposed thereon.

4. A sorbent composition comprising a mixture of about 10 to 90 parts by weight of magnesia-rich chlorite comprising about 10–30 weight percent MgO; and, correspondingly, about 90 to 10 parts by weight of hydrotalcite containing at least about 50 weight percent MgO; wherein at least said chlorite has previously been subjected to sorption of sulfur oxides from a gas and to desorption of sorbed sulfur oxides from said chlorite.

5. In a process of sulfur oxide sorption wherein a gas containing sulfur oxide is contacted at an elevated process temperature with a solid sorbent material to remove sulfur oxide from the gas, the improvement which comprises:
contacting said solid sorbent material comprising at least one magnesia-rich crystalline material having a layered structure comprising layers of brucite, wherein the brucite-containing sorbent material is predominately magnesia, with said gas under sorption conditions;
subjecting said solid sorbent material to desorption of sulfur values; and
recycling said desorbed solid sorbent material to further sorption of sulfur oxides from said gas.

6. The process of claim 5 wherein the solid sorbent material comprises a mixture of magnesia-rich chlorite and hydrotalcite in a weight ratio of about 10:90 to 90:10 chlorite:hydrotalcite.

7. In a process of sulfur oxide sorption from a gas containing at least one sulfur oxide, wherein said gas is contacted, at an elevated process temperature, with a sorbent material under conditions sufficient to remove sulfur oxide from the gas, the improvement that comprises:
effectively contacting said gas with a solid crystalline sorbent material comprising at least one crystalline material comprising layers of brucite structure comprising about 10 to 30 weight percent magnesia under conditions adapted for the sorption of sulfur oxide from said gas; and
where said sorbent material comprises a chlorite layered structure, said chlorite has been subjected to conditions under which:
a sulfur oxide is sorbed from a gas containing sulfur oxide onto said chlorite layered structure; and
sulfur values have been desorbed from said chlorite prior to the instant sorption of sulfur oxide from said gas.

8. The process of claim 7 wherein the amount of sulfur oxide removed from said gas in a second sorption step is greater than the amount of sulfur values sorbed from said gas in a first sorption step.

9. The process of claim 7 wherein the sorbent material further comprises a hydrotalcite.

10. The process of claim 7 wherein said solid crystalline sorbent material has deposited thereon an effective amount of oxidative catalyst comprising at least one metal.

11. The process of claim 7 wherein said solid crystalline sorbent material further comprises at least one metal oxide selected from the group consisting of cerium oxide and vanadium pentoxide.

12. The process of claim 7 wherein said sorbent material consists essentially of amesite.

13. The process of claim 7 wherein said solid crystalline sorbent material consists essentially of at least one chlorite comprising about 14 to 29 wt % magnesia.

14. In a process for cracking a heavy hydrocarbon feed stock containing sulfur compounds, at a process temperature in the range of about 700° to 820° C. and in the presence of a cracking catalyst, to produce a product comprising a gas phase comprising at least one sulfur oxide, wherein the process comprises contacting at least a portion of said gas phase under said process conditions with a sufficient quantity of a solid comprising at least one sulfur oxide sorbent material, to sorb sulfur oxide from said gas;
the improvement comprising:
contacting said gas with a sulfur oxide sorbent material comprising at least one magnesia-rich layered phyllosilicate having alternating silicate and brucite layers in a first pass;
desorbing sulfur values from said sorbent material; and
in a second pass, recycling said desorbed phyllosilicate layered sorbent material in combination with hydrotalcite into effective sorption contact with additional quantities of said sulfur oxide-containing gas, thereby sorbing more sulfur oxide from said gas in said second pass than in said first pass.

15. The process of claim 14 wherein said phyllosilicate contains about 10–30 weight percent magnesium oxide.

16. The process of claim 14 wherein said phyllosilicate consists essentially of amesite.

17. The process of claim 14 wherein said sulfur oxide sorbent material contains hydrotalcite consisting predominately of magnesia.

* * * * *